United States Patent
Shioura et al.

(10) Patent No.: US 12,231,057 B2
(45) Date of Patent: Feb. 18, 2025

(54) POWER CONVERSION DEVICE FOR SUPPRESSING FLOW OF SHORT-CIRCUIT CURRENT TO DISCHARGING RESISTOR

(71) Applicant: Mitsubishi Electric Corporation, Tokyo (JP)

(72) Inventors: Kentaro Shioura, Tokyo (JP); Takeshi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 259 days.

(21) Appl. No.: 17/905,945

(22) PCT Filed: Mar. 26, 2020

(86) PCT No.: PCT/JP2020/013687
§ 371 (c)(1),
(2) Date: Sep. 9, 2022

(87) PCT Pub. No.: WO2021/192145
PCT Pub. Date: Sep. 30, 2021

(65) Prior Publication Data
US 2023/0096893 A1    Mar. 30, 2023

(51) Int. Cl.
*H02J 7/00* (2006.01)
*H02J 7/34* (2006.01)
(Continued)

(52) U.S. Cl.
CPC ............. *H02M 7/44* (2013.01); *H02J 7/0063* (2013.01); *H02J 7/345* (2013.01); *H02M 1/126* (2013.01);
(Continued)

(58) Field of Classification Search
CPC ..................... H02J 2207/50; H02J 2207/20
See application file for complete search history.

(56) References Cited

U.S. PATENT DOCUMENTS

2011/0025278 A1* 2/2011 Balakrishnan .......... H02M 1/32
320/166
2012/0105018 A1* 5/2012 Balakrishnan .......... H02M 1/32
320/166
(Continued)

FOREIGN PATENT DOCUMENTS

CN      204131101 U  *  1/2015
CN      105322511 A  *  2/2016
(Continued)

OTHER PUBLICATIONS

Office Action issued in corresponding Indian Patent Application No. 202227051438, mailed Feb. 27, 2023, 5 pages.
(Continued)

*Primary Examiner* — Sisay G Tiku
(74) *Attorney, Agent, or Firm* — Buchanan Ingersoll & Rooney PC

(57) ABSTRACT

A power conversion apparatus includes a filter capacitor to be charged with electric power fed from a main power source, and a power converter to convert electric power fed via the filter capacitor and feed the converted electric power to a load. The power conversion apparatus further includes a power-source contactor to electrically connect the filter capacitor and the power converter to the main power source or electrically disconnect the filter capacitor and the power converter from the main power source, and a discharging circuit connected in parallel to the filter capacitor. The power conversion apparatus also includes a discharge control circuit to close a discharging contactor included in the discharging circuit after opening of the power-source contactor, and thereby cause the filter capacitor to be discharged.

18 Claims, 9 Drawing Sheets

(51) Int. Cl.
   *H02M 1/12*   (2006.01)
   *H02M 7/44*   (2006.01)

(52) U.S. Cl.
   CPC ....... *H02J 2207/20* (2020.01); *H02J 2207/50* (2020.01)

(56) References Cited

U.S. PATENT DOCUMENTS

| | | |
|---|---|---|
| 2013/0242626 A1 | 9/2013 | Li |
| 2014/0097803 A1* | 4/2014 | Balakrishnan .......... H02M 1/32 320/166 |
| 2015/0256059 A1* | 9/2015 | Balakrishnan .......... H02M 1/32 320/166 |
| 2017/0302156 A1* | 10/2017 | Balakrishnan .......... H02M 1/32 |
| 2024/0204684 A1* | 6/2024 | Shioura ................. H02M 7/537 |

FOREIGN PATENT DOCUMENTS

| | | | | |
|---|---|---|---|---|
| CN | 114087226 A | * | 2/2022 | ........... F04D 27/004 |
| CN | 218648723 U | * | 3/2023 | |
| EP | 2592737 A2 | | 5/2013 | |
| JP | H08251701 A | * | 6/1996 | |
| JP | 2003052179 A | | 2/2003 | |
| JP | 3560766 B2 | * | 9/2004 | |
| JP | 2010041806 A | | 2/2010 | |
| TW | I482405 B | | 4/2015 | |
| WO | WO-2023188043 A1 | * | 10/2023 | |

OTHER PUBLICATIONS

International Search Report (PCT/ISA/210) with English translation and Written Opinion (PCT/ISA/237) mailed on Jul. 7, 2020, by the Japan Patent Office as the International Searching Authority for International Application No. PCT/JP2020/013687.

\* cited by examiner

POWER CONVERSION DEVICE FOR SUPPRESSING FLOW OF SHORT-CIRCUIT CURRENT TO DISCHARGING RESISTOR

TECHNICAL FIELD

The present disclosure relates to a power conversion apparatus.

BACKGROUND ART

Some electric railway vehicles are provided with power conversion apparatuses to convert electric power fed from a substation via an overhead wire into desired electric power and feed the converted power to a load. An example of this type of power conversion apparatus is disclosed in Patent Literature 1. The electric vehicle power supply device disclosed in Patent Literature 1 includes an inverter, a filter capacitor connected between the primary terminals of the inverter, a discharging circuit to cause the filter capacitor to be discharged, and a contactor to electrically connect the inverter and the filter capacitor to a power source or electrically disconnect the inverter and the filter capacitor from the power source.

CITATION LIST

Patent Literature

Patent Literature 1: Unexamined Japanese Patent Application Publication No. 2010-041806

SUMMARY OF INVENTION

Technical Problem

In the electric vehicle power supply device disclosed in Patent Literature 1, when a discharging contactor included in the discharging circuit is turned on by mistake in the closed state of the contactor, a short-circuit current may flow from an overhead wire via the discharging contactor to a discharging resistor included in the discharging circuit and cause burnout in the discharging resistor.

An objective of the present disclosure, which has been accomplished in view of the above situations, is to provide a power conversion apparatus to suppress flowing of a short-circuit current to the discharging resistor.

Solution to Problem

In order to achieve the above objective, a power conversion apparatus according to an aspect of the present disclosure includes a filter capacitor, a power converter, a power-source contactor, a discharging circuit, and a discharge control circuit. The filter capacitor is charged with electric power fed from a main power source. The power converter includes primary terminals between which the filter capacitor is connected, and secondary terminals. The power converter converts electric power fed from the main power source via the filter capacitor into electric power to be fed to a load connected to the secondary terminals, and feeds the converted electric power to the load. The power-source contactor electrically connects the filter capacitor and the power converter to the main power source or electrically disconnects the filter capacitor and the power converter from the main power source. The discharging circuit includes a discharging contactor including an inner coil to be closed in response to discharging of the inner coil, and a capacitor discharging resistor connected in series to the discharging contactor. The discharging circuit is connected in parallel to the filter capacitor. After opening of the power-source contactor, the discharge control circuit causes the inner coil included in the discharging contactor to be discharged and thus closes the discharging contactor, thereby causing the filter capacitor to be discharged.

Advantageous Effects of Invention

According to an aspect of the present disclosure, after opening of the power-source contactor, the discharge control circuit causes the inner coil included in the discharging contactor to be discharged and thus closes the discharging contactor, thereby causing the filter capacitor to be discharged. The operations, involving opening of the power-source contactor and then closing of the discharging contactor, can suppress flowing of a short-circuit current to the discharging resistor.

DESCRIPTION OF EMBODIMENTS

Figure 1:
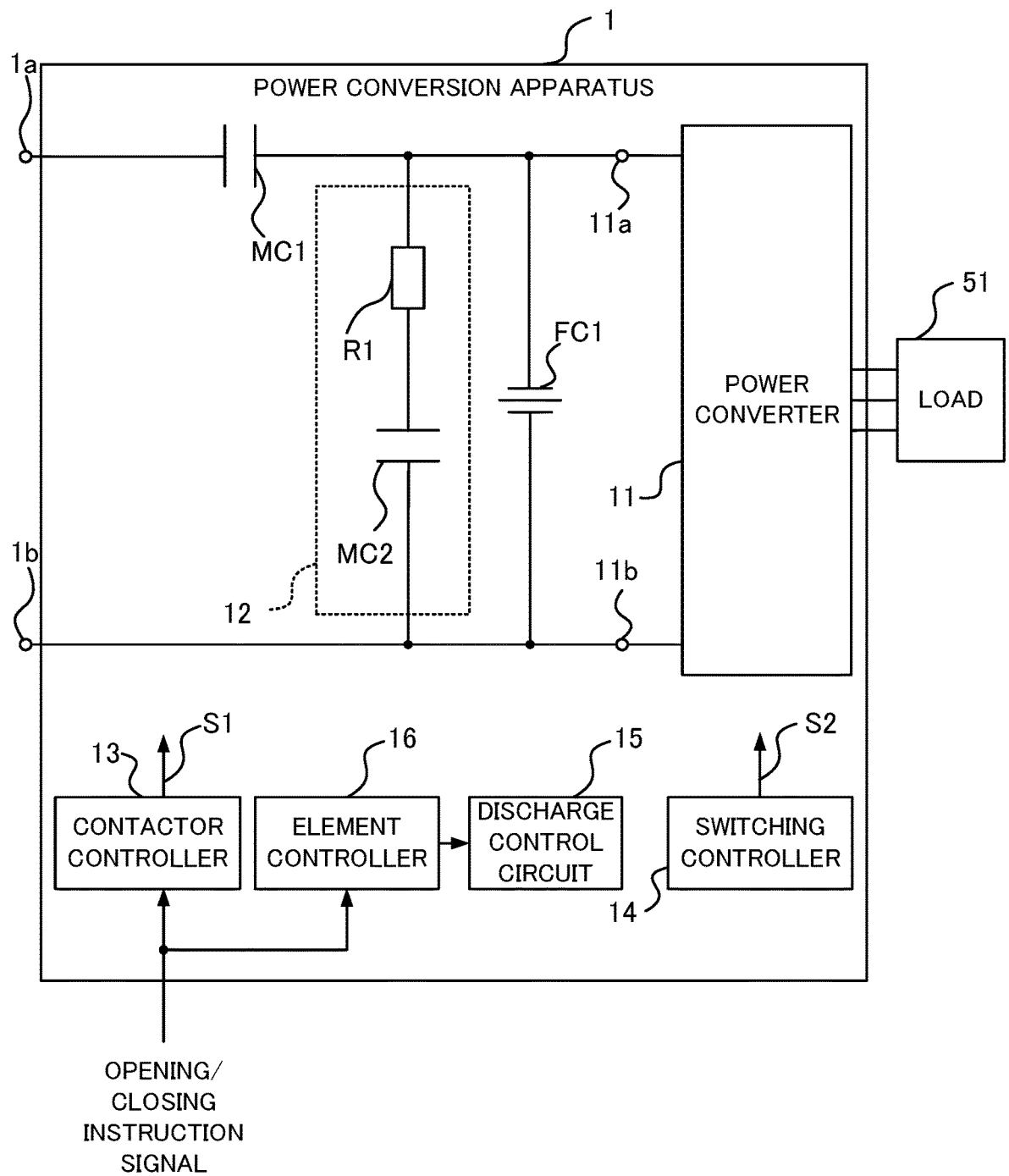
FIG. 1 is a block diagram illustrating a power conversion apparatus according to Embodiment 1.

A power conversion apparatus according to embodiments is described in detail below with reference to the accompanying drawings. In the drawings, the components identical or corresponding to each other are provided with the same reference symbol.

Embodiment 1

A power conversion apparatus 1 according to Embodiment 1 is described below focusing on an exemplary power conversion apparatus installed in a vehicle, in detail, an exemplary auxiliary power source installed in an electric railway vehicle of a DC feeding system. Specifically, the power conversion apparatus 1 converts DC power fed from a main power source via a positive input terminal 1a into electric power to be fed to a load 51, for example, three-phase AC power, and feeds the three-phase AC power to the load 51.

The power conversion apparatus 1, which serves as an auxiliary power source, is required to rapidly discharge a filter capacitor FC1, which is described below, at the stop of the power conversion apparatus 1 in order to achieve rapid restart after the stop. A discharging circuit 12 for discharging the filter capacitor FC1 thus includes a discharging contactor MC2, as is described in detail below. At the stop of the power conversion apparatus 1, the discharging contactor MC2 is closed after opening of a power-source contactor MC1. These operations can suppress flowing of a short-circuit current to a capacitor discharging resistor R1 of the discharging circuit 12.

An exemplary configuration of the power conversion apparatus 1 is described below. The power conversion apparatus 1 includes the positive input terminal 1a connected to the main power source, a negative input terminal 1b to be grounded, the power-source contactor MC1 of which one end is connected to the positive input terminal 1a, and the filter capacitor FC1 of which one end is connected to the other end of the power-source contactor MC1 and the other end is connected to the negative input terminal 1b. The power conversion apparatus 1 further includes a power converter 11 to convert DC power fed via a primary terminal 11a into three-phase AC power and feed the converted power to the load 51, and the discharging circuit 12 connected in parallel to the filter capacitor FC1.

The power conversion apparatus 1 further includes a contactor controller 13 to control the power-source contactor MC1, a switching controller 14 to control the power converter 11, a discharge control circuit 15 to control the discharging contactor MC2 included in the discharging circuit 12, and an element controller 16 to control a relay RY1, which is described below, serving as a switching element included in the discharge control circuit 15.

The components of the power conversion apparatus 1 are described in detail below.

The positive input terminal 1a is connected to a pantograph to acquire electric power from the main power source, for example, from a substation via an overhead wire. The negative input terminal 1b is grounded via a ground brush, a wheel, and a rail, for example.

The one end of the power-source contactor MC1 is connected to the positive input terminal 1a, and the other end is connected to each of the primary terminal 11a of the power converter 11, the one end of the filter capacitor FC1, and one end of the discharging circuit 12. The power-source contactor MC1 is a DC electromagnetic contactor and is controlled by the contactor controller 13.

When the contactor controller 13 closes the power-source contactor MC1, the one and the other ends of the power-source contactor MC1 are connected to each other. This operation causes the power converter 11 and the filter capacitor FC1 to be electrically connected to the main power source and receive electric power from the main power source.

When the contactor controller 13 opens the power-source contactor MC1, the one and the other ends of the power-source contactor MC1 are insulated from each other. This operation causes the power converter 11 and the filter capacitor FC1 to be electrically disconnected from the main power source and receive no electric power from the main power source.

The filter capacitor FC1 is connected between the primary terminals 11a and 11b of the power converter 11 and is charged with electric power fed from the main power source. In detail, the one end of the filter capacitor FC1 is connected to the point of connection between the power-source contactor MC1 and the primary terminal 11a of the power converter 11. The other end of the filter capacitor FC1 is connected to the point of connection between the negative input terminal 1b and the primary terminal 11b of the power converter 11.

The power converter 11 converts DC power fed via the primary terminal 11a into three-phase AC power and feeds the three-phase AC power to the load 51 connected to the secondary terminals of the power converter 11. In detail, the power converter 11 includes multiple high-speed switching elements, such as insulated gate bipolar transistors (IGBTs), capable of high-speed switching. The high-speed switching elements are controlled by the switching controller 14 and thus repetitively switched between the on and off states, so that the power converter 11 converts DC power into three-phase AC power and feeds the three-phase AC power to the load 51, as described above. The load 51 is any in-vehicle device, such as lighting equipment or air conditioner.

The discharging circuit 12 is connected in parallel to the filter capacitor FC1. In detail, the one end of the discharging circuit 12 is connected to the point of connection between the other end of the power-source contactor MC1 and the primary terminal 11a of the power converter 11. The other end of the discharging circuit 12 is connected to the point of connection between the negative input terminal 1b and the primary terminal 11b of the power converter 11.

The discharging circuit 12 includes a capacitor discharging resistor R1 and the discharging contactor MC2 connected in series to the capacitor discharging resistor R1. The following description is directed to the components of the discharging circuit 12.

One end of the capacitor discharging resistor R1 is connected to the point of connection between the other end of the power-source contactor MC1 and the primary terminal 11a of the power converter 11. The capacitor discharging resistor R1 has any resistance provided that the capacitor discharging resistor R1 is able to discharge the filter capacitor FC1 for a predetermined time.

One end of the discharging contactor MC2 is connected to the other end of the capacitor discharging resistor R1, and the other end of the discharging contactor MC2 is connected to the point of connection between the negative input terminal 1b and the primary terminal 11b of the power converter 11. The discharging contactor MC2 is a DC electromagnetic contactor and is controlled by the discharge control circuit 15.

When the discharge control circuit 15 closes the discharging contactor MC2, the one and the other ends of the discharging contactor MC2 are connected to each other. This operation causes the filter capacitor FC1 to be electrically connected to the capacitor discharging resistor R1. This connection thus allows a current to flow from the filter capacitor FC1 to the capacitor discharging resistor R1, thereby causing the filter capacitor FC1 to be discharged.

When the discharge control circuit 15 opens the discharging contactor MC2, the one and the other ends of the discharging contactor MC2 are insulated from each other. In this situation, the filter capacitor FC1 is not electrically connected to the capacitor discharging resistor R1 and thus is not discharged by the capacitor discharging resistor R1.

Figure 2:
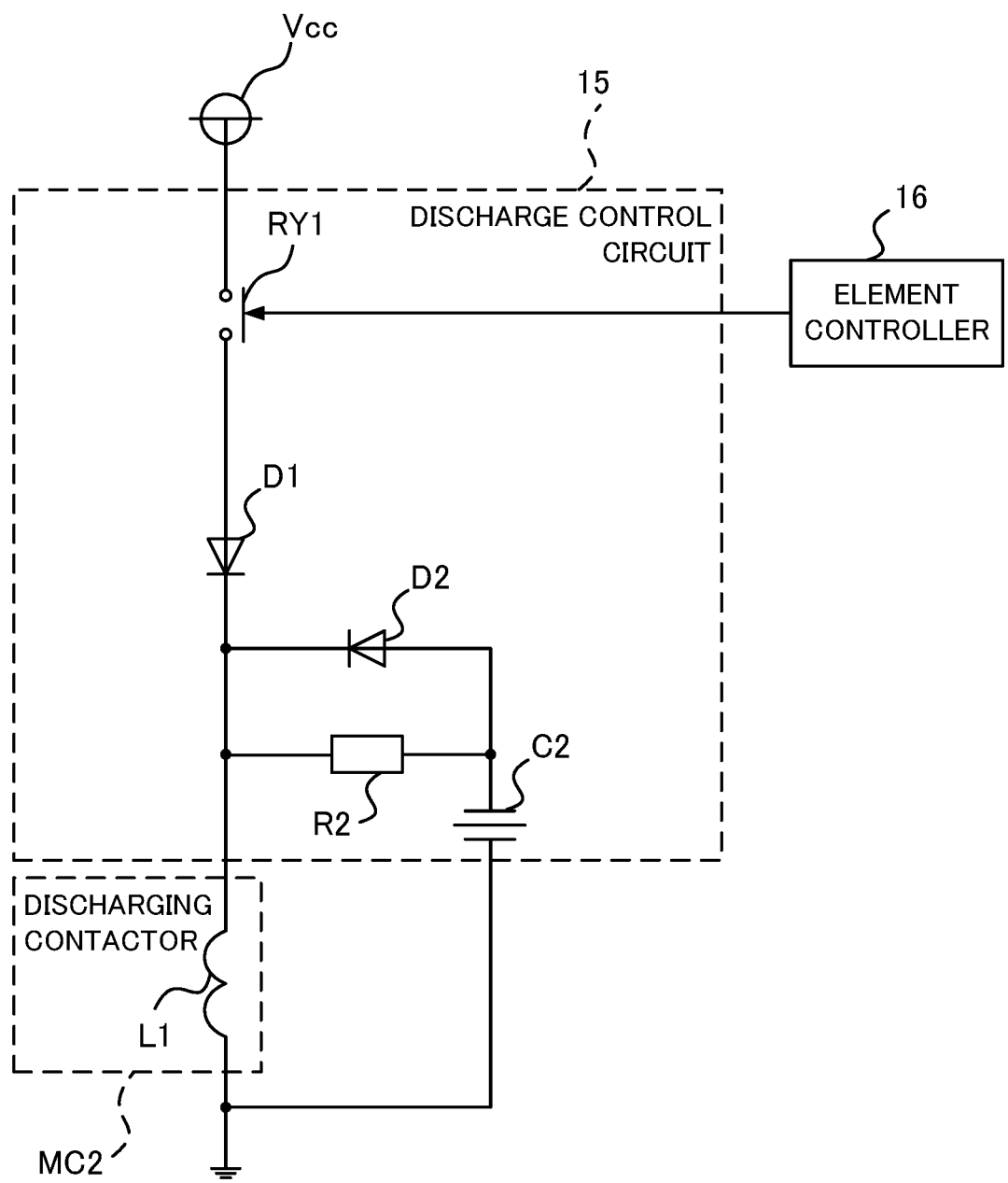
FIG. 2 is a circuit diagram illustrating a discharge control circuit according to Embodiment 1.

As illustrated in FIG. 2, the applied discharging contactor MC2 is a normally closed DC electromagnetic contactor including an inner coil L1. The discharging contactor MC2 is closed in response to discharging of the inner coil L1 and is opened in response to energization of the inner coil L1. One end of the inner coil L1 is electrically connected to a control power source Vcc or electrically disconnected from the control power source Vcc under the control of the discharge control circuit 15, as is described in detail below. The control power source Vcc is a power source independent from the main power source, for example, a battery installed in the electric railway vehicle. The other end of the inner coil L1 is grounded.

The contactor controller 13 illustrated in FIG. 1 is provided with an opening/closing instruction signal for instructing closing or opening of the power-source contactor MC1, from a cab, which is not illustrated. The contactor controller 13 closes or opens the power-source contactor MC1 in accordance with the opening/closing instruction signal. In detail, the contactor controller 13 provides the power-source contactor MC1 with a contactor control signal S1 for instructing closing or opening, and thereby controls the power-source contactor MC1.

The switching controller 14 acquires a measured value of the voltage between the terminals of the filter capacitor FC1 from a voltage measurer, which is not illustrated. After closing of the power-source contactor MC1 and completion of charging of the filter capacitor FC1, the switching controller 14 starts to control the on and off states of the high-speed switching elements included in the power converter 11. In detail, after the measured value of the voltage between the terminals of the filter capacitor FC1 reaches the charged voltage, the switching controller 14 provides each of the high-speed switching elements with a switching control signal S2 for instructing repetition of switching between the on and off states. Accordingly, the power converter 11 converts DC power fed from the main power source into three-phase AC power and feeds the three-phase AC power to the load 51.

The discharge control circuit 15 controls the discharging contactor MC2 by causing the inner coil L1 included in the discharging contactor MC2 to be discharged or energized. The components of the discharge control circuit 15 are described in detail below.

As illustrated in FIG. 2, the discharge control circuit 15 includes the relay RY1, serving as a switching element, and a coil discharging resistor R2 and a control capacitor C2 connected in series to each other. The discharge control circuit 15 preferably includes diodes D1 and D2 in order to cause the inner coil L1 to be discharged while preventing an inverse current to the control power source Vcc in the case of the off state of the relay RY1, as is described in detail below.

One end of the relay RY1 is connected to the control power source Vcc. The other end of the relay RY1 is connected via the diode D1 to the one end of the inner coil L1.

The relay RY1 electrically connects the inner coil L1 to the control power source Vcc or electrically disconnects the inner coil L1 from the control power source Vcc. The relay RY1 is controlled by the element controller 16.

The anode of the diode D1 is connected to the other end of the relay RY1. The cathode of the diode D1 is connected to the one end of the inner coil L1. The diode D1 inhibits an inverse current to the control power source Vcc.

The anode of the diode D2 is connected to the point of connection between the coil discharging resistor R2 and the control capacitor C2. The cathode of the diode D2 is connected to the one end of the inner coil L1. The diode D2 forms an electrical path from the other end to one end of the coil discharging resistor R2, which is described below, and thereby allows the coil discharging resistor R2 and the control capacitor C2 to discharge the inner coil L1.

The coil discharging resistor R2 has one end connected to the point of connection between the diode D1 and the inner coil L1, and the other end connected to one end of the control capacitor C2. The coil discharging resistor R2 has any resistance provided that the coil discharging resistor R2 is able to discharge the inner coil L1 for a desired time. The desired time may be determined depending on, for example, a target value of the time necessary for restart of the power conversion apparatus 1.

The other end of the control capacitor C2 is connected to the other end of the inner coil L1.

In the discharge control circuit 15 having the above-described configuration, when the relay RY1 is turned on by the element controller 16, the inner coil L1 is electrically connected to the control power source Vcc. The discharging contactor MC2 is in the open state because of the energization of the inner coil L1.

Figure 3:
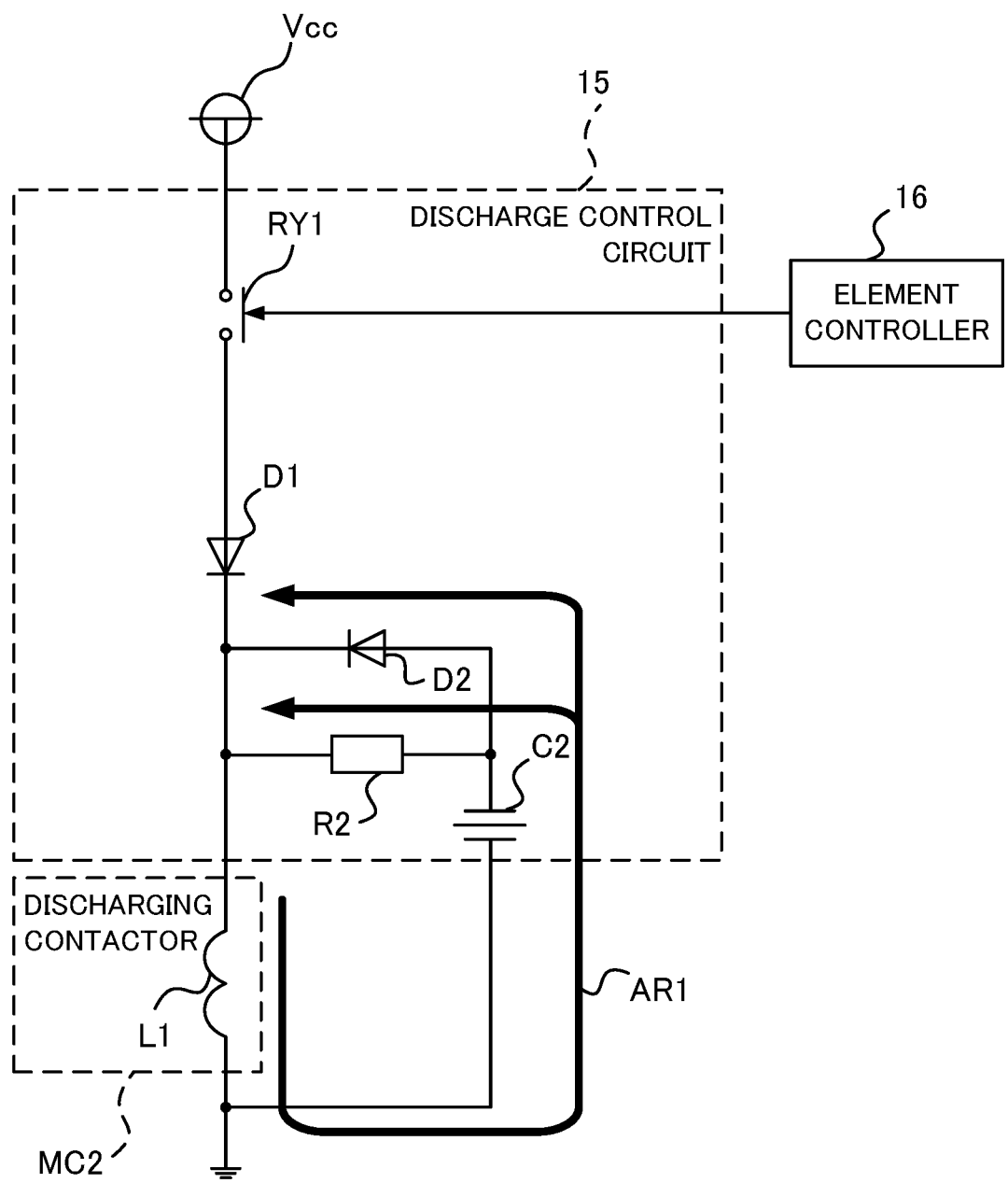
FIG. 3 illustrates a flow of current in the discharge control circuit according to Embodiment 1.

When the relay RY1 is turned off by the element controller 16, the inner coil L1 is electrically disconnected from the control power source Vcc. This operation causes a current to flow from the inner coil L1 via the control capacitor C2 to the coil discharging resistor R2 and the diode D2, as represented by the arrow AR1 in FIG. 3, thereby discharging the inner coil L1. The discharging of the inner coil L1 turns the discharging contactor MC2 into the closed state.

The element controller 16 illustrated in FIG. 1 is provided with an opening/closing instruction signal for instructing closing or opening of the power-source contactor MC1, like the contactor controller 13. The element controller 16 turns on or off the relay RY1 included in the discharge control circuit 15, depending on whether the power-source contactor MC1 is closed or open. In detail, the element controller 16 maintains the relay RY1 in the on state while the power-source contactor MC1 is closed. When the power-source contactor MC1 in the closed state is opened, the element controller 16 immediately turns off the relay RY1.

The element controller 16 also acquires a measured value of the voltage between the terminals of the filter capacitor FC1 from the voltage measurer. When the measured value of the voltage between the terminals of the filter capacitor FC1 declines to a threshold voltage or lower after turning off of the relay RY1, the element controller 16 turns on the relay RY1. That is, the discharging contactor MC2 is opened after completion of discharging of the filter capacitor FC1.

The following description is directed to operations of the power conversion apparatus 1 having the above-described configuration.

At the start of driving of the electric railway vehicle, the pantograph ascends and comes into contact with the overhead wire in response to manipulation of an ascending/descending switch for raising or lowering the pantograph, and thus acquires electric power from the substation via the overhead wire. The description assumes that the power-source contactor MC1 and the discharging contactor MC2 are both open at the start of driving of the electric railway vehicle.

In association with the manipulation of the ascending/descending switch, the cab provides an opening/closing instruction signal to each of the contactor controller 13 and the element controller 16. In detail, when the manipulation of the ascending/descending switch raises the pantograph, the cab provides an opening/closing instruction signal for instructing closing of the power-source contactor MC1 to each of the contactor controller 13 and the element controller 16.

When receiving the opening/closing instruction signal for instructing closing of the power-source contactor MC1, the contactor controller 13 outputs a contactor control signal S1 for instructing closing of the power-source contactor MC1. Due to the closing of the power-source contactor MC1 in response to this signal, the electric power acquired by the pantograph from the substation via the overhead wire is fed to the filter capacitor FC1 via the power-source contactor MC1, to thereby start charging of the filter capacitor FC1.

When receiving the opening/closing instruction signal for instructing closing of the power-source contactor MC1, the element controller 16 maintains the relay RY1 in the on state. This operation leads to energization of the inner coil L1 and thus maintains the discharging contactor MC2 in the open state.

After sufficient charging of the filter capacitor FC1, the switching controller 14 starts to control the on and off states of the high-speed switching elements included in the power converter 11. The high-speed switching elements controlled by the switching controller 14 are repetitively switched between the on and off states. Accordingly, the power converter 11 converts DC power fed via the filter capacitor FC1 into three-phase AC power and feeds the three-phase AC power to the load 51.

Figure 4:
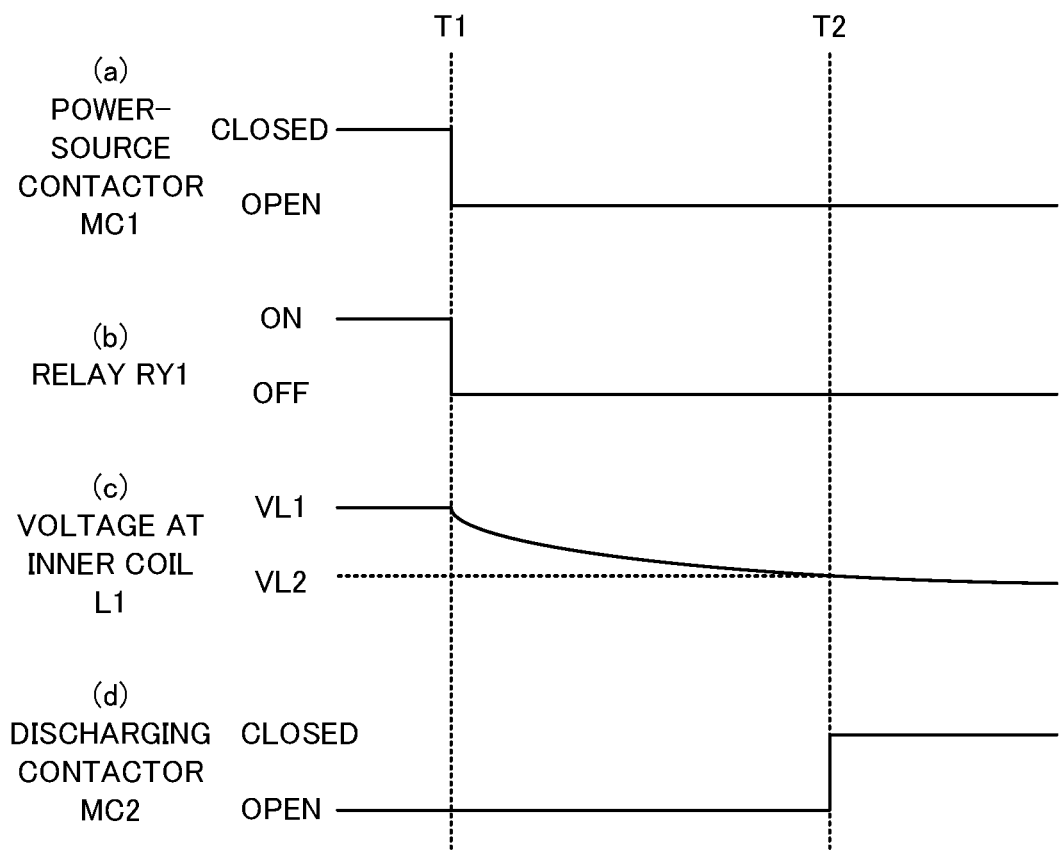
FIG. 4 is a timing chart illustrating a discharging process in the power conversion apparatus according to Embodiment 1, in which the section (a) illustrates a state of a power-source contactor, the section (b) illustrates a state of a relay, the section (c) illustrates a voltage at an inner coil, and the section (d) illustrates a state of a discharging contactor.

The following description is directed to operations of the power conversion apparatus 1 at the stop of driving of the electric railway vehicle, with reference to FIG. 4. At the stop of driving of the electric railway vehicle, the power converter 11 is stopped, followed by opening of the power-source contactor MC1 and then closing of the discharging contactor MC2. The operations of the power conversion apparatus 1 are described below focusing on an example in which the pantograph descends and leaves the overhead wire in response to manipulation of the ascending/descending switch at the time T1.

At the time T1, in association with the manipulation of the ascending/descending switch, a signal for instructing a stopping operation is provided to the switching controller 14. The switching controller 14 then turns off the high-speed switching elements included in the power converter 11 and thus stops the power converter 11.

When the manipulation of the ascending/descending switch lowers the pantograph at the time T1, the cab provides an opening/closing instruction signal for instructing opening of the power-source contactor MC1 to each of the contactor controller 13 and the element controller 16.

When receiving the opening/closing instruction signal for instructing opening of the power-source contactor MC1, the contactor controller 13 outputs a contactor control signal S1 for instructing opening of the power-source contactor MC1. The power-source contactor MC1 is thus opened at the time T1, as illustrated in the section (a) of FIG. 4, so that the power converter 11 and the filter capacitor FC1 are electrically disconnected from the pantograph, that is, the main power source.

When receiving the opening/closing instruction signal for instructing opening of the power-source contactor MC1, the element controller 16 turns off the relay RY1. The relay RY1 is thus turned off at the time T1, as illustrated in the section (b) of FIG. 4. The turning off of the relay RY1 causes the inner coil L1 to be electrically disconnected from the control power source Vcc, so that the voltage at the inner coil L1 starts declining at the time T1 from the voltage VL1 during energization, as illustrated in the section (c) of FIG. 4.

At the time T2, the declining voltage at the inner coil L1 reaches the release voltage VL2, as illustrated in the section (c) of FIG. 4. Accordingly, the discharging contactor MC2 is closed at the time T2, as illustrated in the section (d) of FIG. 4.

The closing of the discharging contactor MC2 causes the capacitor discharging resistor R1 to be electrically connected to the filter capacitor FC1, thereby causing the filter capacitor FC1 to be discharged. The period from the time T1 to the time T2 is determined depending on a time constant calculated by multiplying the sum of the resistance of the capacitor discharging resistor R1 and the coil resistance of the inner coil L1 by the electrostatic capacity of the filter capacitor FC1. The release voltage VL2 is preferably lower than a value calculated by multiplying the voltage VL1 during energization by 1/e, where e indicates a natural logarithm.

After completion of discharging of the filter capacitor FC1, the element controller 16 turns on the relay RY1. In detail, when the measured value of the voltage between the terminals of the filter capacitor FC1 declines to the threshold voltage or lower, the element controller 16 turns on the relay RY1. This operation leads to energization of the inner coil L1 and thus opens the discharging contactor MC2.

As described above, the discharging contactor MC2 is closed after opening of the power-source contactor MC1 in the power conversion apparatus 1 according to Embodiment 1. The power-source contactor MC1 and the discharging contactor MC2 are therefore never in the closed states at the same time. This configuration can suppress flowing of a short-circuit current to the capacitor discharging resistor R1.

Since the configuration can suppress flowing of a short-circuit current to the capacitor discharging resistor R1, the capacitor discharging resistor R1 does not need to have an increased volume so as to prevent the capacitor discharging resistor R1 from burnout due to a short-circuit current flowing to the capacitor discharging resistor R1. In other words, the configuration can suppress expansion of the capacitor discharging resistor R1 in accordance with an increase in the volume of the capacitor discharging resistor R1. The configuration can thus inhibit a size increase in the power conversion apparatus 1.

Embodiment 2

The configuration of the discharge control circuit 15 in Embodiment 1 is a mere example. In detail, the discharge control circuit 15 may have any configuration provided that the discharging contactor MC2 can be closed after opening of the power-source contactor MC1.

Figure 5:
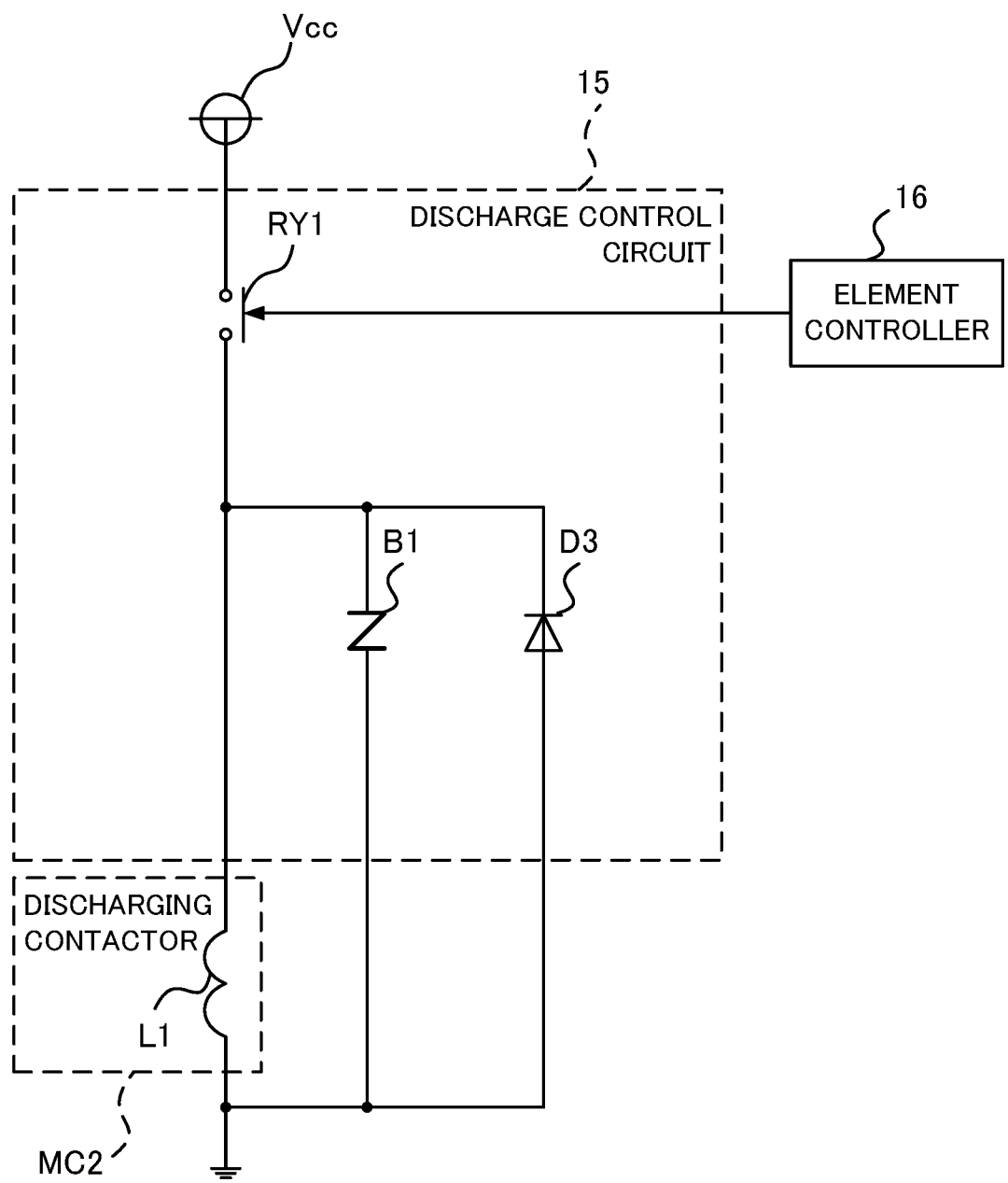
FIG. 5 is a circuit diagram illustrating a discharge control circuit according to Embodiment 2.

The power conversion apparatus 1 according to Embodiment 2 has the configuration identical to that in Embodiment 1. As illustrated in FIG. 5, the discharge control circuit 15 of the power conversion apparatus 1 according to Embodiment 2 includes a relay RY1, serving as a switching element, and a diode D3 connected in parallel to the inner coil L1 of the discharging contactor MC2. The power conversion apparatus 1 preferably further includes a surge absorber element B1 connected in parallel to the inner coil L1 of the discharging contactor MC2.

One end of the relay RY1 is connected to the control power source Vcc. The other end of the relay RY1 is connected to one end of the inner coil L1. The structure and operation of the relay RY1 are identical to those in Embodiment 1.

The diode D3 is connected in parallel to the inner coil L1. In detail, the anode of the diode D3 is connected to the other end of the inner coil L1. The cathode of the diode D3 is connected to the point of connection between the relay RY1 and the inner coil L1.

The surge absorber element B1 is connected in parallel to the inner coil L1. In detail, the surge absorber element B1 is a varistor and suppresses application of overvoltage to the parallelly connected element, that is, to the diode D3 during discharging of the inner coil L1.

In the discharge control circuit 15 having the above-described configuration, when the relay RY1 is turned on by the element controller 16, the inner coil L1 is electrically connected to the control power source Vcc. The discharging contactor MC2 is in the open state because of the energization of the inner coil L1.

Figure 6:
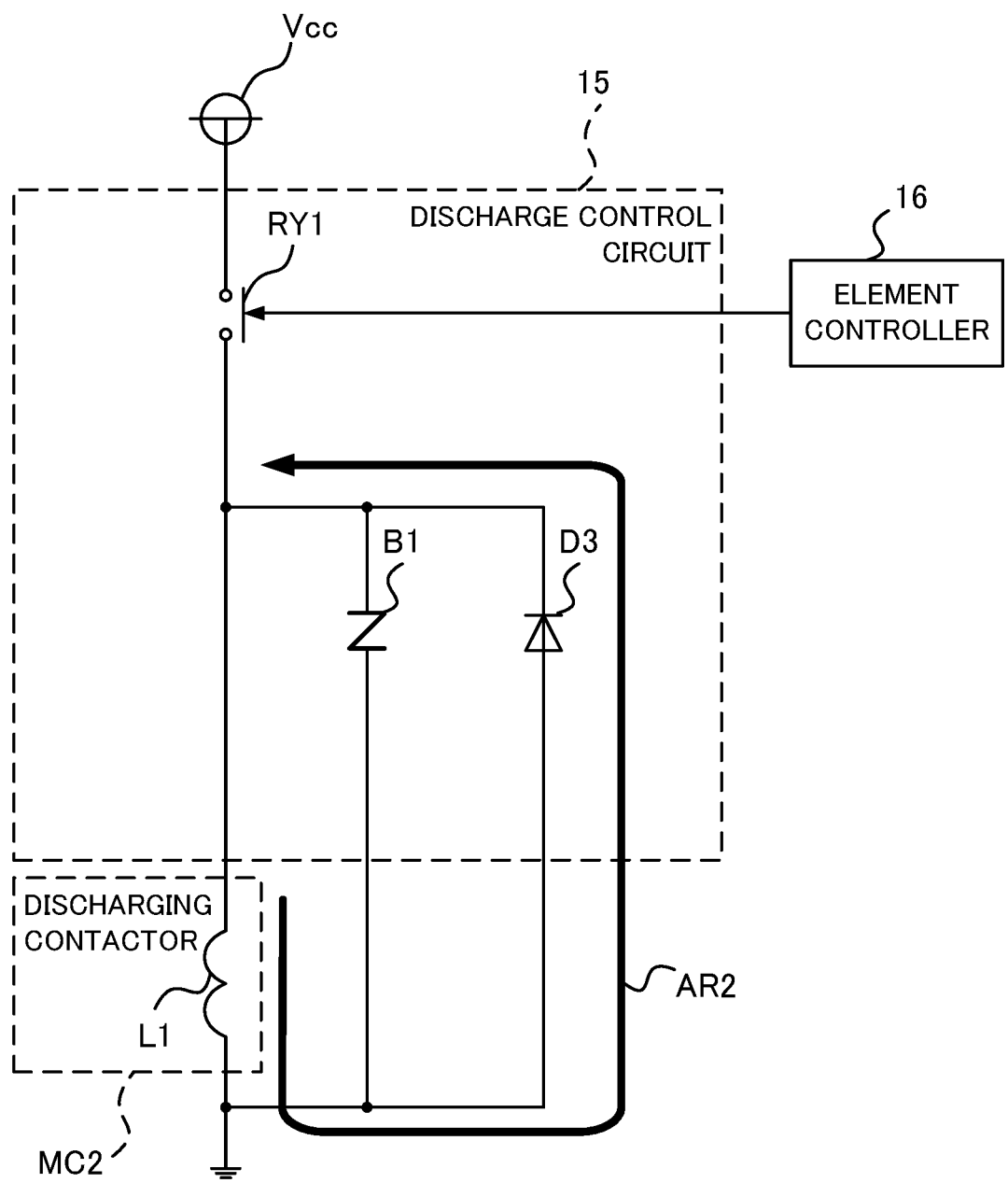
FIG. 6 illustrates a flow of current in the discharge control circuit according to Embodiment 2.

When the relay RY1 is turned off by the element controller 16, the inner coil L1 is electrically disconnected from the control power source Vcc. This operation causes a current to flow from the inner coil L1 to the diode D3, as represented by the arrow AR2 in FIG. 6, thereby causing the inner coil L1 to be discharged. The discharging of the inner coil L1 turns the discharging contactor MC2 into the closed state.

The element controller 16 of the power conversion apparatus 1 according to Embodiment 2 receives an opening/closing instruction signal as in Embodiment 1. The element controller 16 turns on or off the relay RY1 depending on whether the power-source contactor MC1 is closed or open. The element controller 16 of the power conversion apparatus 1 according to Embodiment 2 turns off the relay RY1 at a timing different from that in the element controller 16 of the power conversion apparatus 1 according to Embodiment 1.

In detail, the element controller 16 maintains the relay RY1 in the on state while the power-source contactor MC1 is closed. When the power-source contactor MC1 in the closed state is opened, the element controller 16 waits for a predetermined duration after the opening of the power-source contactor MC1, and then turns off the relay RY1. The predetermined duration is longer than the period from the time of an instruction to open the power-source contactor MC1 until the time of actual opening of the power-source contactor MC1, and can be determined depending on a design value of time necessary for closing of the discharging contactor MC2.

Operations of the power conversion apparatus 1 having the above-described configuration are described below.

The components of the power conversion apparatus 1 perform the operations identical to those in Embodiment 1 at the start of driving of the electric railway vehicle.

Figure 7:
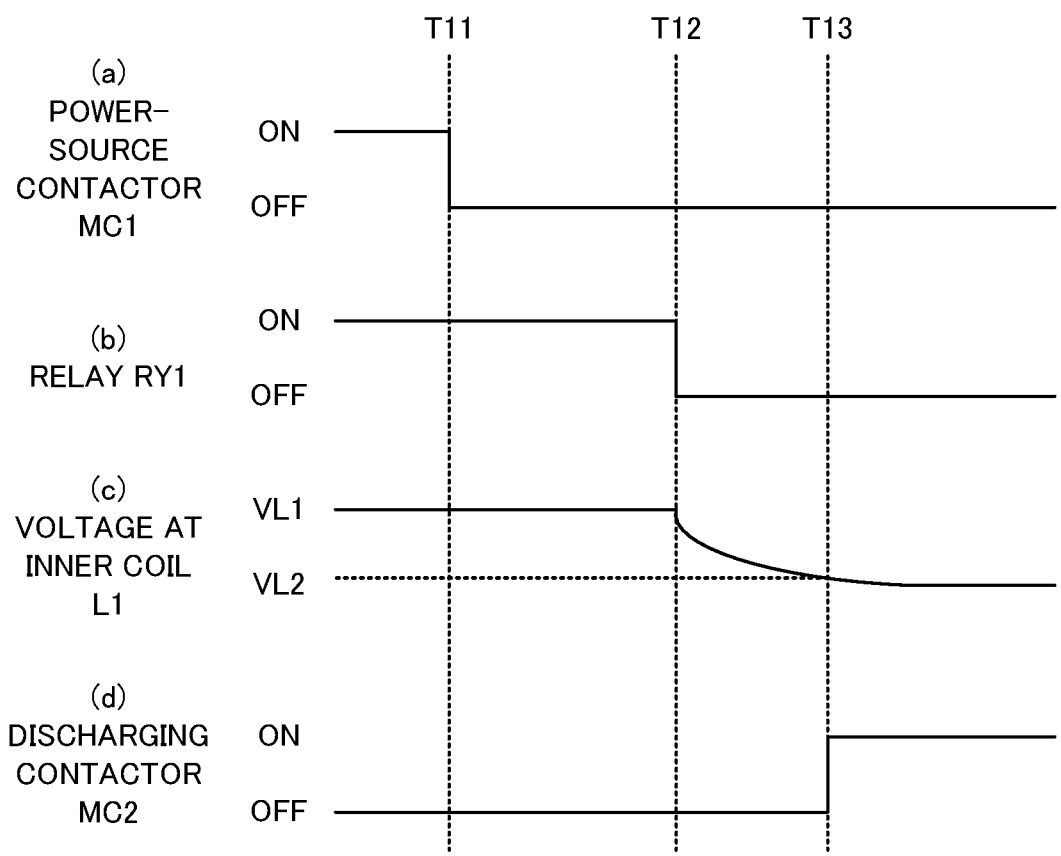
FIG. 7 is a timing chart illustrating a discharging process in the power conversion apparatus according to Embodiment 2, in which the section (a) illustrates a state of a power-source contactor, the section (b) illustrates a state of a relay, the section (c) illustrates a voltage at an inner coil, and the section (d) illustrates a state of a discharging contactor.

The following description is directed to operations of the power conversion apparatus 1 at the stop of driving of the electric railway vehicle, with reference to FIG. 7. At the stop of driving of the electric railway vehicle, the power converter 11 is stopped, followed by opening of the power-source contactor MC1 and then closing of the discharging contactor MC2. The operations of the power conversion apparatus 1 are described below focusing on an example in which the pantograph descends and leaves the overhead wire in response to manipulation of the ascending/descending switch at the time T11.

At the time T11, in association with the manipulation of the ascending/descending switch, a signal for instructing a stopping operation is provided to the switching controller 14. The switching controller 14 then turns off the high-speed switching elements included in the power converter 11 and thus stops the power converter 11.

When the manipulation of the ascending/descending switch lowers the pantograph at the time T11, the cab provides an opening/closing instruction signal for instructing opening of the power-source contactor MC1 to each of the contactor controller 13 and the element controller 16.

When receiving the opening/closing instruction signal for instructing opening of the power-source contactor MC1, the contactor controller 13 outputs a contactor control signal S1 for instructing opening of the power-source contactor MC1. The power-source contactor MC1 is thus opened at the time T11, as illustrated in the section (a) of FIG. 7, so that the power converter 11 and the filter capacitor FC1 are electrically disconnected from the pantograph, that is, the main power source.

When receiving the opening/closing instruction signal for instructing opening of the power-source contactor MC1, the element controller 16 turns off the relay RY1 at the time T12 until which the predetermined duration has passed since the time T11. The relay RY1 is thus turned off at the time T12, as illustrated in the section (b) of FIG. 7. The turning off of the relay RY1 causes the inner coil L1 to be electrically disconnected from the control power source Vcc, so that the voltage at the inner coil L1 starts declining at the time T12 from the voltage VL1 during energization, as illustrated in the section (c) of FIG. 7.

At the time T13, the declining voltage at the inner coil L1 reaches the release voltage VL2, as illustrated in the section (c) of FIG. 7. Accordingly, the discharging contactor MC2 is closed at the time T13, as illustrated in the section (d) of FIG. 7.

The closing of the discharging contactor MC2 causes the capacitor discharging resistor R1 to be electrically connected to the filter capacitor FC1, thereby causing the filter capacitor FC1 to be discharged. The period from the time T12 to the time T13 is determined depending on the coil resistance of the inner coil L1. In other words, the period from the time T12 until the time T13 is shorter than the period from the time T1 until the time T2 in Embodiment 1. The release voltage VL2 is preferably lower than a value calculated by multiplying the voltage VL1 during energization by 1/e.

After completion of discharging of the filter capacitor FC1, the element controller 16 turns on the relay RY1. In detail, when the measured value of the voltage between the terminals of the filter capacitor FC1 declines to the threshold voltage or lower, the element controller 16 turns on the relay RY1. This operation leads to energization of the inner coil L1 and thus opens the discharging contactor MC2.

As described above, in the power conversion apparatus 1 according to Embodiment 2, the discharging contactor MC2 is closed after opening of the power-source contactor MC1. The power-source contactor MC1 and the discharging contactor MC2 are therefore never in the closed states at the same time. This configuration can suppress flowing of a short-circuit current to the capacitor discharging resistor R1.

The discharge control circuit 15 of the power conversion apparatus 1 according to Embodiment 2 is not required to include the control capacitor C2, the coil discharging resistor R2, and the diodes D1 and D2, like those in the discharge control circuit 15 of the power conversion apparatus 1 according to Embodiment 1. The power conversion apparatus 1 according to Embodiment 2 can therefore have a further reduced size in comparison to the power conversion apparatus 1 according to Embodiment 1.

Figure 8:
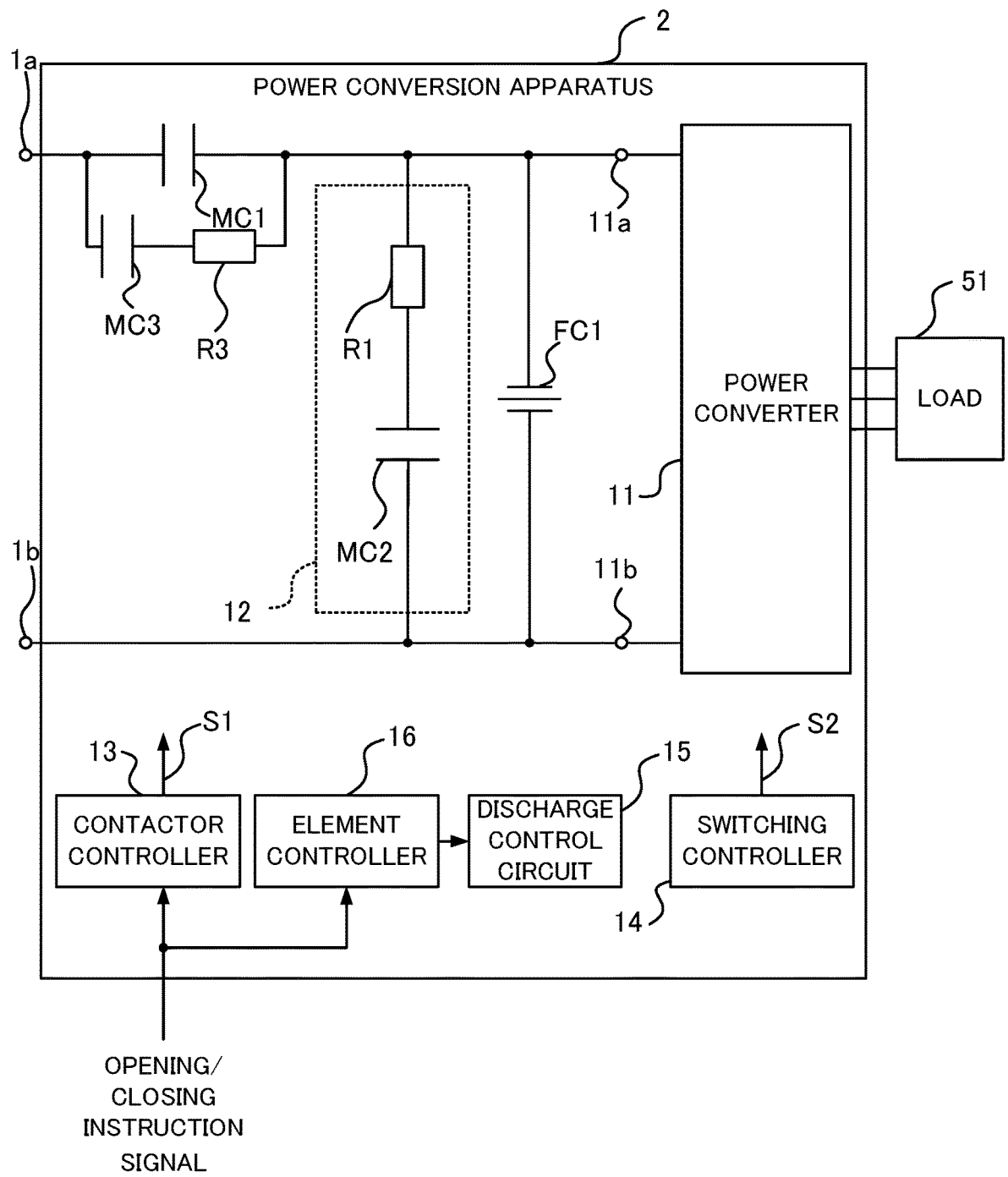
FIG. 8 is a block diagram illustrating a first modification of the power conversion apparatus according to the embodiments.

The above-described circuit configuration of the power conversion apparatus 1 is a mere example. FIG. 8 illustrates another example of a circuit configuration of the power conversion apparatus 1. A power conversion apparatus 2 illustrated in FIG. 8 includes a charging contactor MC3 and a charging resistor R3, in addition to the components of the power conversion apparatus 1 illustrated in FIG. 1.

The charging contactor MC3 and the charging resistor R3 are connected in series to each other. The serially connected charging contactor MC3 and charging resistor R3 are connected in parallel to the power-source contactor MC1.

In detail, one end of the charging contactor MC3 is connected to the point of connection between the one end of the power-source contactor MC1 and the positive input terminal 1a. The other end of the charging contactor MC3 is connected to one end of the charging resistor R3. The other end of the charging resistor R3 is connected to the point of connection between the other end of the power-source contactor MC1 and the primary terminal 11a of the power converter 11.

The charging contactor MC3 is controlled by the contactor controller 13.

In detail, when receiving an opening/closing instruction signal for instructing closing of the power-source contactor MC1, the contactor controller 13 outputs a contactor control signal S1 for instructing closing of the charging contactor MC3. Due to the closing of the charging contactor MC3 in response to this signal, electric power is fed from the main power source via the charging contactor MC3 and the charging resistor R3 to the filter capacitor FC1, to thereby start charging of the filter capacitor FC1.

The contactor controller 13 acquires a measured value of the voltage between the terminals of the filter capacitor FC1 from the voltage measurer, which is not illustrated. When the measured value of the voltage between the terminals of the filter capacitor FC1 reaches the charged voltage, the contactor controller 13 of the power conversion apparatus 2 outputs a contactor control signal S1 for instructing closing of the power-source contactor MC1. The power-source contactor MC1 is closed in response to this signal, and electric power is fed from the main power source via the power-source contactor MC1 to the filter capacitor FC1.

After outputting the contactor control signal S1 for instructing closing of the power-source contactor MC1, the contactor controller 13 outputs a contactor control signal S1 for instructing opening of the charging contactor MC3. The charging resistor R3 is electrically disconnected from the main power source in response to this signal.

The above-described operations, involving closing of the charging contactor MC3 and then closing of the power-source contactor MC1, can suppress flowing of an inrush current to the filter capacitor FC1.

Figure 9:
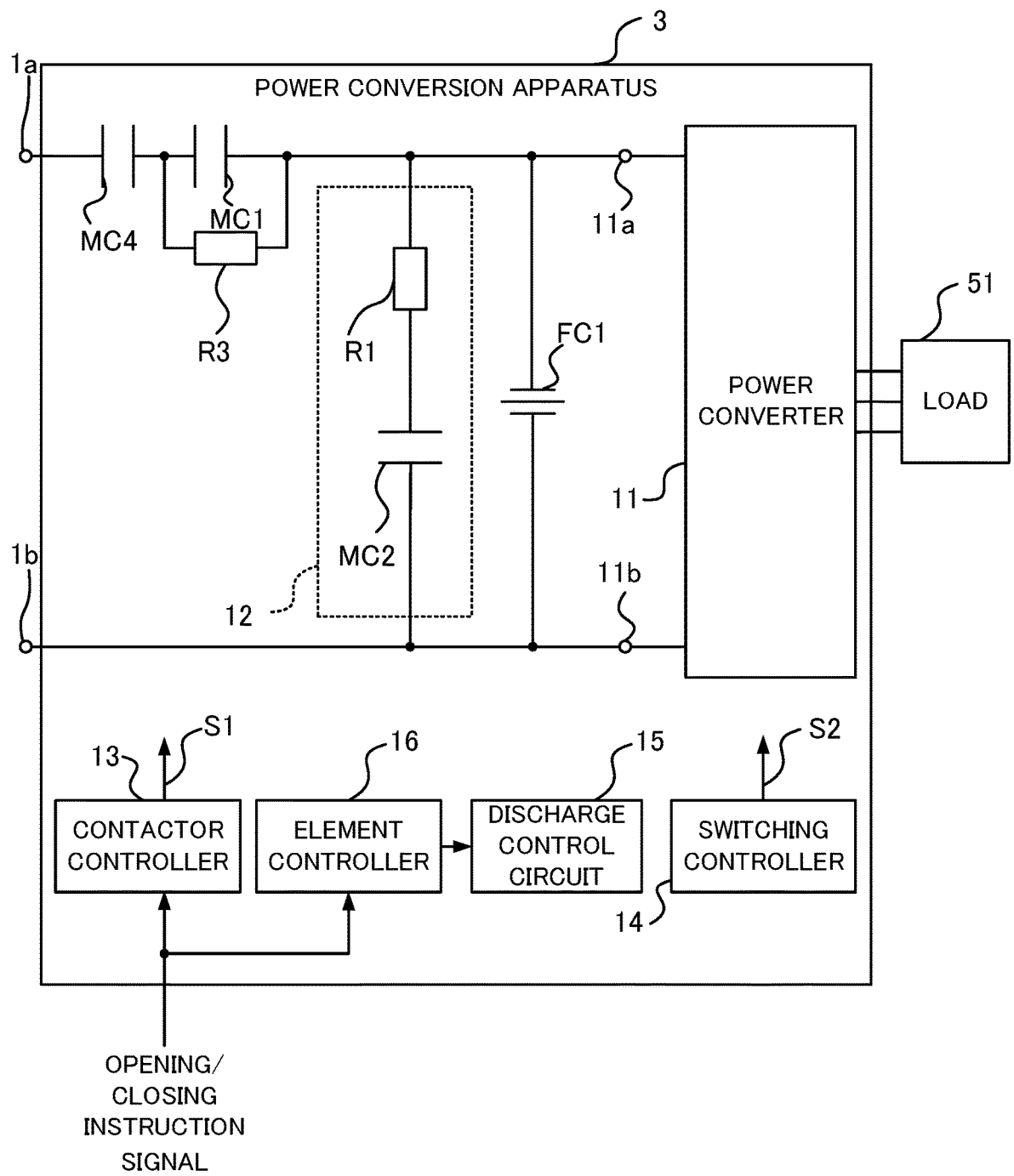
FIG. 9 is a block diagram illustrating a second modification of the power conversion apparatus according to the embodiments.

FIG. 9 illustrates a still another example of a circuit configuration of the power conversion apparatus 1.

A power conversion apparatus 3 illustrated in FIG. 9 includes a charging contactor MC4 and a charging resistor R3, in addition to the components of the power conversion apparatus 1 according to Embodiment 1 illustrated in FIG. 1. The charging contactor MC4 is connected to the positive input terminal 1a and the one end of the power-source contactor MC1. One end of the charging resistor R3 is connected to the point of connection between the charging contactor MC4 and the power-source contactor MC1. The other end of the charging resistor R3 is connected to the point of connection between the power-source contactor MC1 and the primary terminal 11a of the power converter 11.

The charging contactor MC4 is controlled by the contactor controller 13.

In detail, when receiving an opening/closing instruction signal for instructing closing of the power-source contactor MC1, the contactor controller 13 outputs a contactor control signal S1 for instructing closing of the charging contactor MC4. Due to the closing of the charging contactor MC4 in response to this signal, electric power is fed from the main power source via the charging contactor MC4 and the charging resistor R3 to the filter capacitor FC1, to thereby start charging of the filter capacitor FC1.

The contactor controller 13 acquires a measured value of the voltage between the terminals of the filter capacitor FC1 from the voltage measurer, which is not illustrated. When the measured value of the voltage between the terminals of the filter capacitor FC1 reaches a threshold voltage, the contactor controller 13 of the power conversion apparatus 3 outputs a contactor control signal S1 for instructing closing of the power-source contactor MC1. The power-source contactor MC1 is closed in response to this signal, and electric power is fed from the main power source via the charging contactor MC4 and the power-source contactor MC1 to the filter capacitor FC1.

The above-described components of the power conversion apparatuses 1 to 3 are mere examples.

The element controller 16 may acquire a state signal indicating whether the power-source contactor MC1 is closed or open, from the power-source contactor MC1. In this case, when the element controller 16 detects that the power-source contactor MC1 in the closed state is opened on the basis of the state signal acquired from the power-source contactor MC1, the element controller 16 turns off the relay RY1 and thus closes the discharging contactor MC2.

The power conversion apparatuses 1 to 3 may further include a filter reactor disposed between the other end of the power-source contactor MC1 and the primary terminal 11a of the power converter 11. The filter reactor can achieve smoothing of the current input to the power converter 11.

The power converter 11 is any power conversion circuit. In an exemplary case where the load 51 operates on DC power, the power converter 11 may be a direct current-direct current (DC-DC) converter.

The discharge control circuit 15 may include any switching element, such as IGBT, metal-oxide-semiconductor field-effect transistor (MOSFET), or thyristor, instead of the relay RY1.

The discharge control circuit 15 of the power conversion apparatus 1 according to Embodiment 2 may include the diode D1 as in Embodiment 1.

The power conversion apparatuses 1 to 3 are not necessarily an auxiliary power source but may be any power conversion apparatus including the filter capacitor FC1.

The power conversion apparatuses 1 to 3 can be installed in any vehicle, equipment, or the like that can feed electric power to the power conversion apparatuses 1 to 3. For example, the power conversion apparatuses 1 to 3 can be installed in an electric railway vehicle of an AC feeding system. In this case, the power conversion apparatuses 1 to 3 may include a transformer of which a primary terminal is connected to the pantograph, and a converter connected to secondary terminals of the transformer to convert AC power into DC power, such that an output from the converter is fed to the power conversion apparatuses 1 to 3.

For another example, the power conversion apparatuses 1 to 3 may also be installed in an electric railway vehicle that acquires electric power via a third rail.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3 Power conversion apparatus
1a Positive input terminal
1b Negative input terminal
11 Power converter
11a, 11b Primary terminal
12 Discharging circuit
13 Contactor controller
14 Switching controller
15 Discharge control circuit
16 Element controller
51 Load
AR1, AR2 Arrow
B1 Surge absorber element
C2 Control capacitor
D1, D2, D3 Diode
FC1 Filter capacitor
L1 Inner coil
MC1 Power-source contactor
MC2 Discharging contactor
MC3, MC4 Charging contactor
R1 Capacitor discharging resistor
R2 Coil discharging resistor
R3 Charging resistor
RY1 Relay
S1 Contactor control signal
S2 Switching control signal
Vcc Control power source

The invention claimed is:

1. A power conversion apparatus comprising:
a filter capacitor to be charged with electric power fed from a main power source;
power converting circuitry comprising primary terminals between which the filter capacitor is connected, and secondary terminals, the power converting circuitry being configured to convert the electric power fed from the main power source via the filter capacitor into electric power to be fed to a load connected to the secondary terminals, and feed the converted electric power to the load;
a power-source contactor to electrically connect the filter capacitor and the power converting circuitry to the main power source or electrically disconnect the filter capacitor and the power converting circuitry from the main power source;
a discharging circuit connected in parallel to the filter capacitor, the discharging circuit comprising:
a discharging contactor that includes an inner coil, the discharging contactor being configured to be closed in response to discharging of the inner coil and to be opened in response to energization of the inner coil; and
a capacitor discharging resistor connected in series to the discharging contactor; and
a discharge control circuit to, after opening of the power-source contactor, cause the inner coil included in the discharging contactor to be discharged and thus close the discharging contactor, thereby causing the filter capacitor to be discharged,
wherein the discharge control circuit comprises:
a switching element to electrically connect the inner coil to a control power source or electrically disconnect the inner coil from the control power source; and
a coil discharging resistor and a control capacitor connected in series to each other, and
the coil discharging resistor and the control capacitor are connected in parallel to the inner coil.

2. The power conversion apparatus according to claim 1, further comprising element controlling circuitry to turn on or off the switching element depending on whether the power-source contactor is closed or open.

3. The power conversion apparatus according to claim 2, wherein the element controlling circuitry maintains the switching element in an on state while the power-source contactor is closed, and immediately turns off the switching element when the power-source contactor in a closed state is opened.

4. The power conversion apparatus according to claim 3, wherein the switching element is a relay of which one end is connected to the control power source and another end is connected to the inner coil.

5. The power conversion apparatus according to claim 2, wherein the element controlling circuitry maintains the switching element in an on state while the power-source contactor is closed, and waits for a predetermined duration after opening of the power-source contactor and then turns off the switching element when the power-source contactor in a closed state is opened.

6. The power conversion apparatus according to claim 5, wherein the switching element is a relay of which one end is connected to the control power source and another end is connected to the inner coil.

7. The power conversion apparatus according to claim 2, wherein the switching element is a relay of which one end is connected to the control power source and another end is connected to the inner coil.

8. The power conversion apparatus according to claim 1, wherein the switching element is a relay of which one end is connected to the control power source and another end is connected to the inner coil.

9. A power conversion apparatus comprising:
a filter capacitor to be charged with electric power fed from a main power source;
power converting circuitry comprising primary terminals between which the filter capacitor is connected, and secondary terminals, the power converting circuitry being configured to convert the electric power fed from the main power source via the filter capacitor into electric power to be fed to a load connected to the secondary terminals, and feed the converted electric power to the load;
a power-source contactor to electrically connect the filter capacitor and the power converting circuitry to the main power source or electrically disconnect the filter capacitor and the power converting circuitry from the main power source;
a discharging circuit connected in parallel to the filter capacitor, the discharging circuit comprising:
a discharging contactor that includes an inner coil, the discharging contactor being configured to be closed in response to discharging of the inner coil and to be opened in response to energization of the inner coil; and
a capacitor discharging resistor connected in series to the discharging contactor; and a discharge control circuit to, after opening of the power-source contactor, cause the inner coil included in the discharging contactor to be discharged and thus close the discharging contactor, thereby causing the filter capacitor to be discharged, wherein the discharge control circuit comprises:

a switching element to electrically connect the inner coil to a control power source or electrically disconnect the inner coil from the control power source; and a diode connected in parallel to the inner coil such that a cathode of the diode is connected to a point of connection between the switching element and the inner coil.

10. The power conversion apparatus according to claim 9, wherein the discharge control circuit further comprises a surge absorber element connected in parallel to the inner coil.

11. The power conversion apparatus according to claim 10, further comprising element controlling circuitry to turn on or off the switching element depending on whether the power-source contactor is closed or open.

12. The power conversion apparatus according to claim 11, wherein the element controlling circuitry maintains the switching element in an on state while the power-source contactor is closed, and immediately turns off the switching element when the power-source contactor in a closed state is opened.

13. The power conversion apparatus according to claim 11, wherein the element controlling circuitry maintains the switching element in an on state while the power-source contactor is closed, and waits for a predetermined duration after opening of the power-source contactor and then turns off the switching element when the power-source contactor in a closed state is opened.

14. The power conversion apparatus according to claim 10, wherein the switching element is a relay of which one end is connected to the control power source and another end is connected to the inner coil.

15. The power conversion apparatus according to claim 9, further comprising element controlling circuitry to turn on or off the switching element depending on whether the power-source contactor is closed or open.

16. The power conversion apparatus according to claim 15, wherein the element controlling circuitry maintains the switching element in an on state while the power-source contactor is closed, and immediately turns off the switching element when the power-source contactor in a closed state is opened.

17. The power conversion apparatus according to claim 15, wherein the element controlling circuitry maintains the switching element in an on state while the power-source contactor is closed, and waits for a predetermined duration after opening of the power-source contactor and then turns off the switching element when the power-source contactor in a closed state is opened.

18. The power conversion apparatus according to claim 9, wherein the switching element is a relay of which one end is connected to the control power source and another end is connected to the inner coil.

* * * * *